United States Patent [19]

Haese

[11] 4,005,045

[45] Jan. 25, 1977

[54] METHOD FOR CARRYING OUT ENDOTHERMIC CHEMICAL REACTIONS WITH THE USE OF NUCLEAR REACTOR COOLING GASES

[75] Inventor: Egon Haese, Bochum-Linden, Germany

[73] Assignee: Dr. C. Otto & Comp. G.m.b.H., Bochum, Germany

[22] Filed: Aug. 15, 1973

[21] Appl. No.: 388,347

[30] Foreign Application Priority Data

Aug. 17, 1972 Germany .................. 2240355

[52] U.S. Cl. .................. 252/373; 176/39
[51] Int. Cl.$^2$ .................. C01B 2/16; C01B 2/02
[58] Field of Search .......... 176/39; 423/648, 650, 423/651, 652, 655, 653; 48/196 R; 252/373

[56] References Cited

UNITED STATES PATENTS

| | | | |
|---|---|---|---|
| 1,960,886 | 5/1934 | Woodhouse | 423/652 |
| 3,198,710 | 8/1965 | Long | 176/39 |
| 3,228,850 | 1/1966 | Fellows | 176/39 |
| 3,264,066 | 8/1966 | Quartulli | 23/212 |
| 3,297,408 | 1/1967 | Marshall, Jr. | 423/652 |
| 3,420,642 | 1/1969 | Percival | 48/214 |
| 3,441,393 | 4/1969 | Finneran et al. | 48/197 |
| 3,467,506 | 9/1969 | Toulouse | 48/214 |
| 3,535,082 | 10/1970 | Nurnberg et al. | 423/655 |
| 3,573,224 | 3/1971 | Strelzoff | 252/376 |

FOREIGN PATENTS OR APPLICATIONS 15,376  8/1967  Japan

OTHER PUBLICATIONS

"Chemical Engineers' Handbook", Perry, John H. 4th Ed., McGraw-Hill Bk. Co.
"Unit Operations of Chemical Engineering," McCabe, Warren L., McGraw-Hill Bk. Co., 2nd ed.

Primary Examiner—Samuel W. Engle
Assistant Examiner—Ralph Palo
Attorney, Agent, or Firm—Brown, Murray, Flick & Peckham

[57] ABSTRACT

A process for carrying out an endothermic chemical reaction, such as the water-gas reaction, wherein heat is supplied to the reaction from nuclear reactor cooling gases. The invention is characterized in that water vapor and fuel, for example, are passed through a series of heat exchangers and reaction chambers in series, the heat exchangers being disposed within a conduit through which cooling gases from a nuclear reactor flow. When a fuel such as methane, for example, is being dissociated in the endothermic reaction, additional fuel is added to each reaction chamber where heat is supplied from the nuclear reactor cooling medium via a separate heat exchanger for that chamber.

9 Claims, 4 Drawing Figures

METHOD FOR CARRYING OUT ENDOTHERMIC CHEMICAL REACTIONS WITH THE USE OF NUCLEAR REACTOR COOLING GASES

BACKGROUND OF THE INVENTION

While not limited thereto, the present invention is particularly adapted for use in an endothermic chemical reaction such as that employed to produce water-gas. In a reaction of this type, water vapor is reacted with a methane-rich gas such as natural gas, the methane-rich gas being transformed into a synthesized gas usually consisting of hydrogen and carbon dioxide and/or carbon monoxide. A dissociation process of this type is preferably carried out in a closed processing chamber filled with a catalyst, usually nickel, the chamber being heated by means of hot gases which flow around the chamber, or through tubes within the chamber, in which the dissociation process occurs.

It is known, for example, that helium emanating from a nuclear reactor can be used for the purpose of heating the reaction chamber in such an endothermic process. In the past, such a cooling medium from a nuclear reactor has been used to heat a dissociation reaction furnace of this type by passing the nuclear reactor cooling gas through conduits or flow chambers within the reaction chamber itself.

In view of the fact that catalyst-filled reaction chambers for carrying out endothermic reactions can have only a relatively small diameter in view of the limited thermal conductivity of gases passing therethrough and the requirement for uniform heating of such gases, it becomes necessary to employ a very large number of dissociation tubes within each reaction chamber in order to have an economical installation. Since it is necessary to provide for appreciable thermal expansion when heating the dissociation tubes with a nuclear reactor cooling medium, consideration of this expansion plays a significant role in the design of such reaction chambers. Consideration must be taken of the fact that the heat exchanger is disposed within a conduit to which high pressure nuclear reactor cooling gases are subject. In addition, the stresses on the tubing connecting the heat exchanger to the reaction chamber, particularly at the seam welds and in the vicinity of the bushings around the conduits connecting the heat exchanger to the reaction chamber, are very critical. Furthermore, in the past, only a single reaction chamber was contemplated, the chamber being heated by the cooling gas from a nuclear reactor flowing through tubing within the reactor.

SUMMARY OF THE INVENTION

In accordance with the present invention, a new and improved method for carrying out an endothermic reaction utilizing the heat of a nuclear reactor cooling medium is employed wherein the reactor cooling medium itself does not flow through the endothermic reaction chamber. Rather, a dissociating medium and/or a mixture of the dissociating medium and fuel are passed through a series of heat exchangers disposed within a conduit carrying the nuclear reactor cooling medium. The products of the dissociation process are passed through successive ones of the heat exchangers and, between the heat exchangers, through successive reaction chambers to each of which is added a portion of the fuel to be dissociated. In this manner, the endothermic reaction is carried out in a stepwise manner with heat being added to the reaction via the heat exchangers between successive reaction chambers.

Specifically, there is provided a method for carrying out an endothermic chemical reaction of the type wherein a fuel is dissociated by reaction with a gaseous medium and wherein a mixture of the gaseous medium and fuel are heated by a cooling medium from a nuclear reactor and pass through a plurality of serially-connected reaction chambers.

In the process of the invention, the gaseous dissociating medium is initially passed through a first heat exchanger to a first of the serially-connected reaction chambers; while a portion of the fuel to be dissociated is added to the first reaction chamber. Thereafter, the output of the first reaction chamber is passed through a second heat exchanger and thence to a second of the reaction chambers while adding another portion of the fuel to the second reaction chamber. This process is repeated in each of the serially-connected chambers in a multi-stage manner with the product formed in each reaction chamber being fed to, and heated in, the next successive heat exchanger and then fed to the following reaction chamber together with a further portion of the fuel, the process being continued in similar stages until the remainder of the fuel is fed into the last reaction chamber of the installation. At the same time, heat is supplied to the heat exchangers, disposed within a conduit, by the nuclear reactor cooling medium which flows through the conduit. Thus, instead of passing the nuclear reactor cooling medium through tubing within a dissociation reaction chamber itself, the heat is supplied indirectly by means of heat exchangers through which the dissociating medium or a mixture of the dissociating medium and fuel are passed before being introduced into successive ones of a plurality of serially-connected reaction chambers.

In the event that the dissociation process is to be carried out with the aid of a catalyst, such as nickel, it becomes necessary to determine the amount of fuel to be fed to each processing chamber where methane is dissociated or another fuel containing a product having a tendency to form soot. This is necessary such that, after conversion of the fuel, the product fed to the next heat exchanger, inclusive of the unused dissociating medium, has a methane or other hydrocarbon content with a soot-forming tendency which remains below the soot limit under the operating conditions existing in the heat exchanger.

With the process of the invention, the dissociating medium, usually steam, can be subjected several times to a thermal exchange via the plurality of heat exchangers which interconnect the succeeding stages or reaction chambers. As a result, the amount of heat absorbed by the dissociating gas can be raised several-fold. As will be appreciated from the following detailed description, it is possible to determine the number of stages or reaction chambers which are necessary to react the fuel to a desired degree.

In the case where a methane-rich gas comprises the fuel for the endothermic reaction, the problem often arises of initially deriving a methane-rich gas which is suitable for the dissociation process from other fuel such as, for example, petroleum. When petroleum is used as a basic material, the methane-rich gas is obtained by a process in which mixtures of heavier hydrocarbons are treated with hydrogen and, if necessary, with water vapor and converted into high calorific-value gases at temperatures between 600° C and 800° C and pressures above 10 atmospheres. The production of these high calorific-value gases, which also necessitates the addition of heat, can be effected in accordance with the principles of the present invention with the use of propulsive jet or loop reactors having a high internal stirring action. In this case, hydrogen may be mixed with water vapor and initially heated in a heat exchanger and then fed to a reaction chamber. Such a process, which may be effected in a single stage or multi-stage manner, is then introduced into the dissociation process of the present invention, the rich gas obtained in this manner being cooled and desulfurized prior to subsequent treatment in order to make it possible to employ more sensitive catalysts in the dissociation process wherein the high calorific gas is dissociated into hydrogen and carbon dioxide or carbon monoxide, for example.

When solid fine-grained fuels are to be gasified in a water-gas reaction, fluidized bed reactors or eddy bed reactors can serve as the processing reactors, in which case solid material precipitators should be employed immediately after the reaction chamber.

In order that no precipitation of particulate matter takes place in the heat exchangers of the system of the invention, the flow velocity of the material being processed should be greater than the sinking or settling speed of the solid.

The above and other objects and features of the invention will become apparent from the following detailed description taken in connection with the accompanying drawings which form a part of this specification, and in which.

Figure 1:
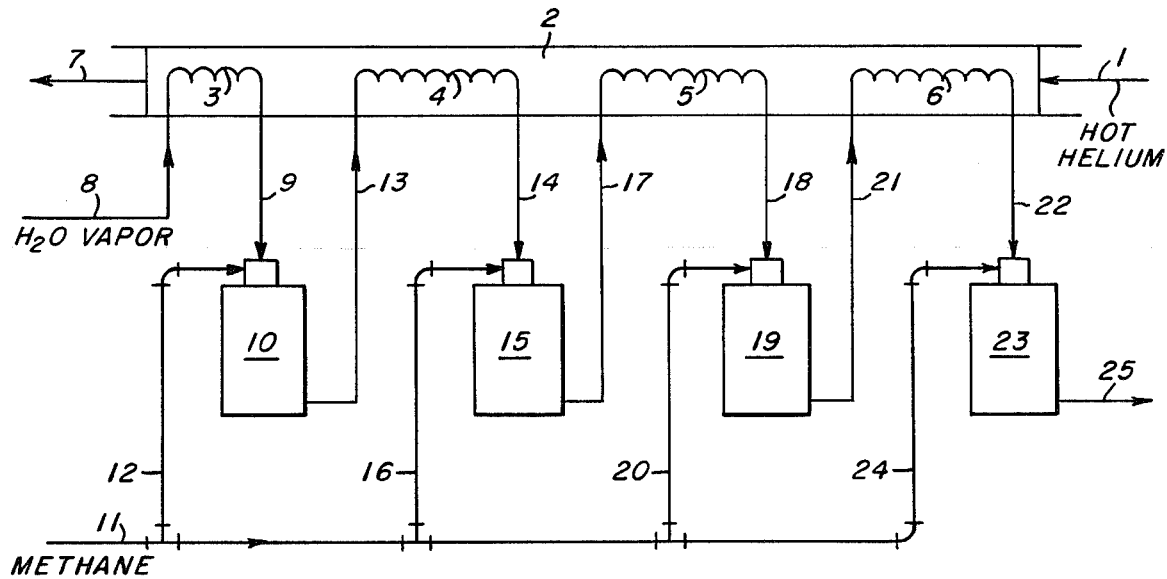
FIG. 1 is a schematic diagram of the apparatus utilized to carry out the process of the invention.

With reference now to the drawings, and particularly to FIG. 1, there is shown in schematic form the layout of a dissociation plan which, in the diagram, takes the form of a four-stage dissociation installation.

Hot helium from a nuclear reactor, not shown, enters a conduit 2 of a heat exchanger and passes, in succession, through coils or heat exchanger elements 6,5,4 and 3. The helium leaves the conduit 2 at 7 to be used again in the nuclear reactor. For the heat exchanger elements, spiral coils or the like may be used, or any other form of construction which has proved satisfactory for high temperature heat exchangers.

The dissociating medium which, in the case of methane dissociation is mainly water vapor, enters the system via pipeline 8 where it enters the heat exchanger 3 and is heated to the temperature of the hot helium in the conduit 2, after which it is fed via conduit 9 to a first dissociation reaction chamber 10. Also added to the reaction chamber 10 via conduits 11 and 12 is fuel for the dissociation process which may, for example, consist of a gas having a high methane content.

As will be appreciated, only a portion of the gas in conduit 11 will enter the reaction chamber 10 via conduit 12. Upon contact of the heated water vapor in conduit 9 with the fuel from conduit 12 within the reaction chamber 10, part of the fuel is dissociated. In the case where methane is used as a fuel, carbon dioxide and/or carbon monoxide and hydrogen are formed. The reaction, however, is not complete. Thus, the mixture leaving the reaction chamber 10 includes water vapor, some undissociated methane, and the products of the reaction. The mixture leaving the reaction chamber 10 via conduit 13 has, of course, an appreciably lower temperature than the water fed into the reaction chamber via conduit 9.

When a sulfur-free fuel is employed, the reaction chambers 10, 15, 19 and 23 are filled with a catalyst, preferably nickel, which is applied to a substrate and over which the mixture of gases passes.

The mixture passing through conduit 13 and consisting of the output of reaction chamber 10 is heated in heat exchanger 4 and fed to the reaction chamber 15 via conduit 14. Another portion of the fuel to be processed flows into the reaction chamber 15 via conduit 16.

A further portion of the fuel is dissociated in reaction chamber 15. In the case of methane, part of it is dissociated, in the course of which the mixture passing through the reaction chamber 15 undergoes a drop in temperature since, as explained above, the reaction is endothermic.

The mixture from reaction chamber 15 then flows through conduit 17 to heat exchanger 5 where it is heated and then passes via conduit 18 into reaction chamber 19. In the chamber 19, a further portion of the fuel to be dissociated is fed into the chamber 19 via conduit 20. Heat is absorbed once again in the reaction chamber 19 so that the mixture leaving this chamber via conduit 21 is appreciably cooler than that entering through conduit 18.

From conduit 21, the mixture again passes through a heat exchanger 6 and thence through conduit 22 to the final reaction chamber 23 where the final portion of the fuel to be dissociated is fed to the chamber 23 via conduit 24. The end product of the dissociation process leaves the system via conduit 25.

Figure 2:
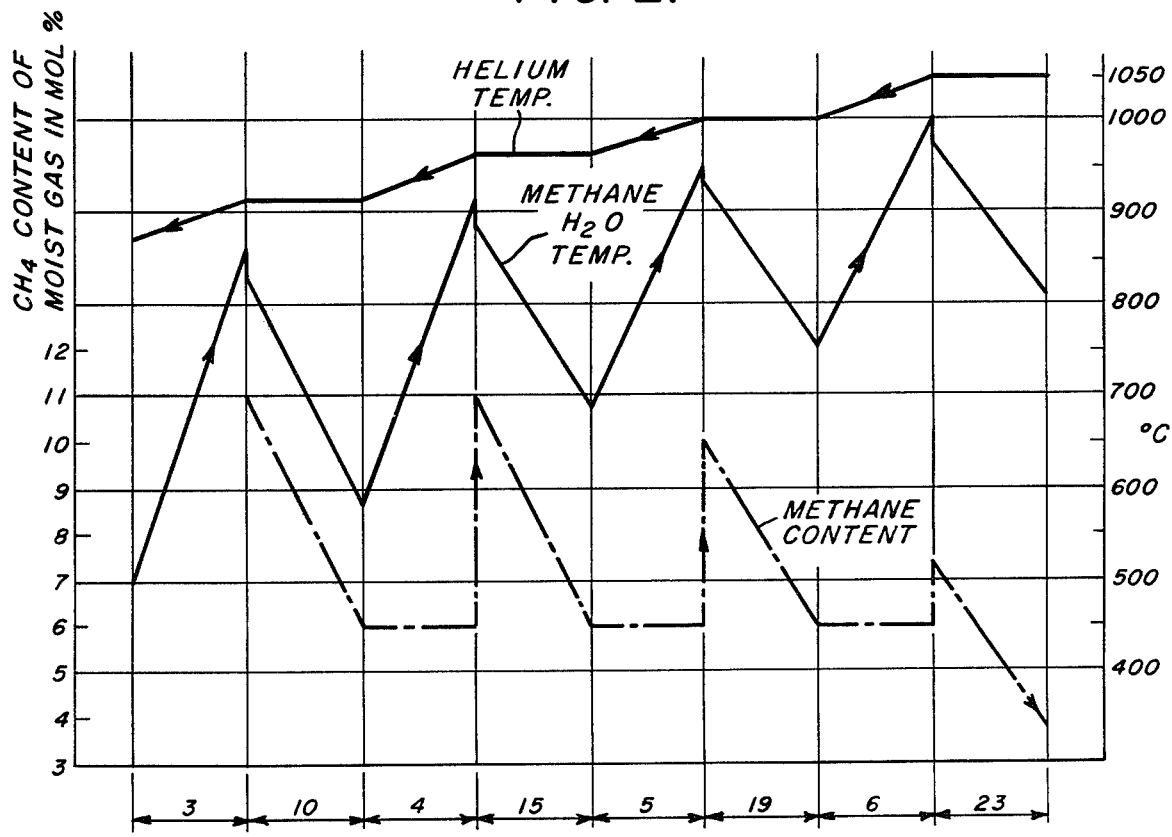
FIG. 2 is a plot showing the variation of the temperature of the nuclear reactor cooling medium, the temperature of the fuel-dissociation gas mixture and the fuel content of the gas mixture as it progresses from one successive reaction chamber to the next in the system of FIG. 1.

The graph of FIG. 2 illustrates variations in helium temperature, the methane-water vapor temperature and the methane content in the various stages of the system of FIG. 1. In order to prevent the formation of soot in the heat exchangers within the conduit 2, the amount of fuel fed to each reaction chamber is metered out in such a way that, at the exit of each reaction chamber, the methane content of the emerging product is never higher than 6% by volume.

In the graph of FIG. 2, the individual stages constituting the heat exchangers and reaction chambers of the installation are separated from each other by vertical lines along the abscissa of the graph. Sections 3, 4, 5 and 6 correspond to the heat exchangers shown in FIG. 1; while sections 10, 15, 19 and 23 represent the reaction chambers associated with the four heat exchangers. The ordinate to the right represents the degrees in centigrade, applicable to the helium temperature and methane-water vapor temperature; while the ordinate to the left refers to the methane content of the moist gas in mol percent.

The uppermost curve, representing helium temperature, falls in steps in moving from right to left. The zig-zag line below it shows the variation in temperature of the methane-water vapor mixture and the dissociated product passing through the various stages. Note that as the mixture passes through each heat exchanger, its temperature increases and then decreases as it passes through a reaction chamber, the temperature in each reaction chamber gradually increasing. The bottom dot-dash line shows the methane content of the material to be treated in the various stages. It will be noted that it decreases from a maximum value of 11 mol percent at the entrance to reaction chamber 10 and decreases to less than about 4 mol percent as it leaves the reaction chamber 23.

The temperature of the helium, as it enters the conduit 2 at 1, is about 1050° C and decreases to a temperature of about 870° C as it exits the conduit 2 after having transferred heat to the water vapor-methane mixture via the heat exchangers within the conduit 2. In the first heat exchanger 3, the water vapor in conduit 8 is heated from about 500° C to about 850° C. In the second heat exchanger, the mixture of water vapor, fuel and the dissociated product has its temperature raised from about 590° C to 905° C. In the third heat exchanger 5, the mixture of gases has its temperature raised from 690° C to 950° C; while in the fourth heat exchanger 6, the temperature of the mixture is raised from about 750° C to 1000° C. As was explained above and as shown in FIG. 2, a drop in temperature occurs in the reaction chambers 10, 15, 19 and 23. Note from FIG. 2 that the methane content at the exit end of each reaction chamber does not exceed 6 mol percent.

The following are actual examples of the operation of the system in accordance with the teachings of the invention:

EXAMPLE I

Natural gas having the following composition was dissociated in the system of FIG. 1:

$CH_4$ = 81.3 Vol. %
$C_2H_6$ = 2.7 Vol. %
$C_3H_8$ = 0.4 Vol.%
$C_nH_m$ = 0.2 Vol. % - misc. hydrocarbons
$O_2$ = 0.1 Vol. %
$CO_2$ = 1.0 Vol. %
$N_2$ = 14.3 Vol. %

It is desired to produce from natural gas of the foregoing composition a dissociated gas whose methane content is no greater than about 6.4 volume percent and whose final pressure is about 30 atmospheres. As shown in FIG. 2 and as explained above, the heating medium flowing through conduit 2, namely helium, enters at 1050° C and should leave the conduit at about 850° C.

The drop in pressure in each heat exchanger and its associated reaction chamber is about 0.5 atmosphere. The system is operated in such a way that the minimum temperature difference between the mixture of gases flowing through the heat exchangers and the helium at the exit end of each heat exchanger does not exceed 50° C. As can be seen from FIG. 2, the total input of heat is almost uniformly divided among the individual heat exchangers, the helium temperature gradually decreasing from right to left. The number of water vapor molecules in the dissociating medium can be varied between 2 and 14 mol per atom of carbon. In the example given, the following analysis was obtained for the dissociated gas at the output of the reaction chamber 23:

$H_2$ = 68.7 Vol. %
CO = 10.3 Vol. %
$CO_2$ = 10.1 Vol. %
$CH_4$ = 6.6 Vol. %
$N_2$ = 4.3 Vol. %

3.326 cubic nanometers of dissociated gas having the foregoing composition were obtained from 1 cubic nanometer of natural gas.

Figure 3:
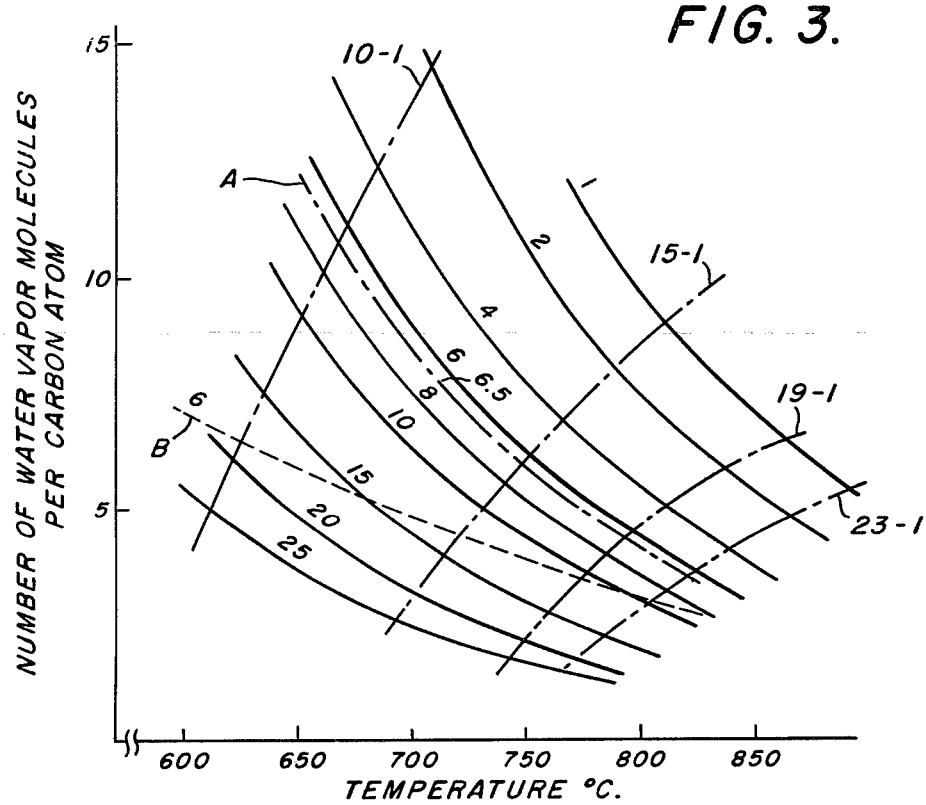
FIG. 3 is a plot of temperature versus the number of water molecules per carbon atom, the various curves in FIG. 3 illustrating the performance of the invention for actual operating conditions.

The graph in FIG. 3 illustrates how the reaction proceeds. The abscissa corresponds to the temperature in degrees centigrade at which the dissociation reaction is terminated. The ordinate represents the number of water vapor molecules per atom of carbon. The curves which slope downwardly from left to right as viewed in FIG. 3 and which are numbered 1, 2, 4, 6, 8, 10, 15, 20 and 25, give the final content of dry methane in volume percent which is obtained from the reaction (i.e., 1% final content to 25% final content). The dot-dashed line A corresponds to a dry final methane content of 6.5 volume percent; while the broken line B corresponds to a moist methane content of 6 volume percent. Note that as the final methane content decreases, the volume percent of water increases, indicating a more complete reaction. The dot-dash lines numbered 10-1, 15-1, 19-1, and 23-1 show the water content at the exits of the reaction chambers 10, 15, 19 and 23, respectively, for various temperature ranges.

In the following table, the data of which was derived from the graph shown in FIG. 3, illustrates how much of the dissociating medium is used up in the various stages:

| No. of Stages | Mol $H_2O$ Atom C | Temperature Upon Terminating the Reaction - ° C |
|---|---|---|
| 1 | 10.8 | 670 |
| 2 | 6 | 748 |
| 3 | 4.4 | 794 |
| 4 | 3.65 | 820 |

EXAMPLE II

In the following example, the input temperature of the helium in conduit 2 was 1150° C and the exit temperature was 970° C. Otherwise, the conditions were the same as in Example I given above. In particular, the composition of the natural gas, the pressure drop in the heat exchangers, the input of heat to the individual stages, and the effective thermal exchange of the heat exchangers are the same. The set of curves corresponding to this second example is presented in FIG. 4.

The abscissa again represents the temperature in degrees centigrade at which the reaction is terminated. The ordinate again represents the number of water molecules per atom of carbon. The curves which slope downwardly from left to right and which are numbered 1, 2, 4, 6, 8, 10, 15, 20 and 25 again represent the final content of dry methane in volume percent. The dot-dash line A again corresponds to a dry methane content of 6.5 volume percent while the dashed line B corresponds to a moist methane content of 6 volume percent. The dot-dash lines rising from left to right and numbered 10-1, 15-1, and 19-1 show the water contents at the exit ends of the reactors 10, 15 and 19, respectively. It will be noted by comparison of FIGS. 3 and 4 that as the temperature of the helium is raised (FIG. 4), the water content at the exit end of each reactor decreases markedly, indicating a more complete reaction in each chamber.

Figure 4:
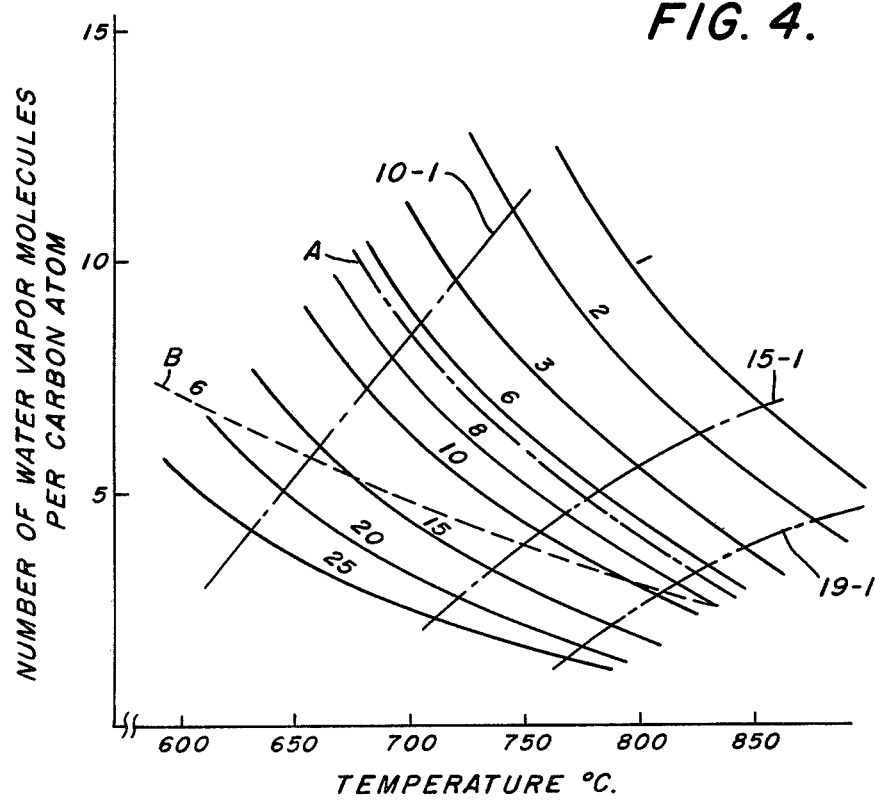
FIG. 4 is a plot similar to that of FIG. 3 illustrating the operating conditions for another actual example of the invention.

The following table presents data from the diagram shown in FIG. 4:

| No. of Stages | Mol H$_2$O Atom C | Temperature at Termination of Reaction - °C |
|---|---|---|
| 1 | 8.5 | 700 |
| 2 | 5.0 | 778 |
| 3 | 3.5 | 824 |

This example shows that a residual methane content of dissociated gas of about 6.5 volume percent can readily be obtained with 3 stages, and with a lower consumption of water vapor if a higher helium temperature is employed. An additional reaction chamber can be incorporated if it is required to reduce the exit temperature of helium in order to improve usage of the heat.

Although the invention has been shown in connection with certain specific examples, it will be readily apparent to those skilled in the art that various changes in form and arrangement of parts may be made to suit requirements without departing from the spirit and scope of the invention.

I claim as my invention:

1. In the method for carrying out an endothermic chemical reaction of the type wherein a hydrocarbon fuel is dissociated by reaction with a gaseous medium and wherein a mixture of the gaseous medium and fuel are heated by a cooling medium from a nuclear reactor and passed through a plurality of serially-connected reaction chambers, the steps of:
   1. passing said gaseous medium through a first heat exchanger to the first of said serially-connected reaction chambers while adding a portion of said fuel to the first reaction chamber,
   2. passing the output of said first reaction chamber through a second heat exchanger and thence to a second of said reaction chambers while adding another portion of the fuel to the second reaction chamber,
   3. repeating step (2) by passing the output of each reaction chamber through a heat exchanger and thence to a succeeding one of said serially-connected reaction chambers while adding a portion of the fuel to each reaction chamber, and
   4. causing a cooling medium from said nuclear reactor to contact all of said heat exchangers whereby heat from the cooling medium is transferred via said heat exchangers to said reaction chambers to facilitate said endothermic chemical reaction.

2. The method of claim 1 wherein said gaseous medium consists essentially of water vapor while said fuel consists essentially of a hydrocarbon gas.

3. The method of claim 1 including the step of passing said gaseous medium and fuel through said reaction chambers such that the mixture is subjected to a nickel catalyst.

4. The method of claim 2 wherein the dissociated hydrocarbon gas includes methane including the step of adjusting the hydrocarbon gas fed to each reaction chamber such that, after dissociation of the hydrocarbon gas, the product formed and fed to the succeeding heat exchanger and reaction chamber has a methane content which remains below the soot limit under the heating conditions existing in said succeeding heat exchanger.

5. The method of claim 1 including the step of heating a mixture of heavy hydrocarbons with hydrogen and with water vapor which are heated by said cooling medium from said nuclear reactor, the treated mixture being fed through said serially-connected reaction chambers and heat exchangers.

6. The method of claim 5 including the step of cooling and desulfurizing the product obtained by treating heavy hydrocarbons with hydrogen and water vapor prior to their passage through said serially-connected heat exchangers and reaction chambers.

7. The method of claim 1 wherein said hydrocarbon fuel consists essentially of finely-divided particulate matter and wherein the fuel, in passing through said reaction chambers, is subjected to the action of a fluidized bed.

8. The method of claim 7 characterized in that the velocity of the finely-divided particulate matter in said heat exchangers and reaction chambers is greater than the sinking speed of said particulate matter.

9. The method of claim 1 wherein said flow of fluid through the heat exchangers is in a direction opposite to the flow of said cooling medium from the nuclear reactor.

* * * * *